(12) United States Patent
Gray

(10) Patent No.: US 7,029,264 B2
(45) Date of Patent: Apr. 18, 2006

(54) FORMING STRUCTURE FOR EMBOSSING AND DEBOSSING POLYMERIC WEBS

(75) Inventor: Brian Francis Gray, Wyoming, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 33 days.

(21) Appl. No.: 10/799,246

(22) Filed: Mar. 12, 2004

(65) Prior Publication Data
US 2004/0191348 A1    Sep. 30, 2004

Related U.S. Application Data

(60) Provisional application No. 60/458,866, filed on Mar. 28, 2003.

(51) Int. Cl.
*B29C 59/00* (2006.01)

(52) U.S. Cl. .................. 425/290; 425/326.1; 425/363; 425/387.1; 425/388

(58) Field of Classification Search .............. 425/290, 425/326.1, 363, 387.1, 388, 405.1, 471
See application file for complete search history.

(56) References Cited

U.S. PATENT DOCUMENTS

| | | | |
|---|---|---|---|
| 2,567,275 A | 9/1951 | Colombo | |
| RE23,910 E | 12/1954 | Smith | |
| 2,912,723 A * | 11/1959 | Roberts | 264/518 |
| 3,054,148 A | 9/1962 | Zimmerli | |
| 3,247,579 A | 4/1966 | Cattermole | |
| 3,453,712 A | 7/1969 | MacKendrick | |
| 3,518,726 A * | 7/1970 | Banks | 28/121 |
| 3,613,208 A | 10/1971 | Seberg | |
| 3,674,221 A | 7/1972 | Riemersma | |
| 4,151,240 A | 4/1979 | Lucas | |
| 4,342,314 A | 8/1982 | Radel | |
| 4,463,045 A | 7/1984 | Ahr | |
| 4,601,868 A | 7/1986 | Radel | |
| 4,609,518 A | 9/1986 | Curro | |
| 4,629,643 A | 12/1986 | Curro | |
| 4,778,644 A | 10/1988 | Curro | |

* cited by examiner

*Primary Examiner*—Donald Heckenberg
(74) *Attorney, Agent, or Firm*—Roddy M. Bullock; David M. Weirich; Ken K. Patel

(57) ABSTRACT

A forming structure for use in an apparatus for making formed polymeric film. The forming structure comprises a first portion comprising a network of interconnecting members defining apertures, the apertures being spaced in a pattern defining a first percent open area, a second portion being solid and having no apertures and zero percent open area; and a third portion being a transition between and joining the first and second portions, the transition portion exhibiting a second percent open area, the second percent open area of the third portion being less than the first percent open area of first portion.

1 Claim, 6 Drawing Sheets

FORMING STRUCTURE FOR EMBOSSING AND DEBOSSING POLYMERIC WEBS

CROSS REFERENCE TO RELATED APPLICATIONS

This application claims the benefit of U.S. Provisional Application No. 60/458,866, filed Mar. 28, 2003.

FIELD OF THE INVENTION

The present invention relates to a forming structure for making a polymeric web exhibiting apertures. More particularly, the present invention relates forming structure for making a three-dimensional polymeric web that can be used as a body-facing topsheet in disposable absorbent.

BACKGROUND OF THE INVENTION

Apparatuses comprising various means for unwinding, forwarding, debossing or embossing, and/or perforating, and rewinding of a ribbon or web of thermoplastic film are disclosed in the prior art: see for instance, U.S. Pat. No. Re. 23,910, Method of And Apparatus For Producing Textured Films which issued Dec. 14, 1954 to L. H. Smith et al.; U.S. Pat. No. 3,054,148, Process Of Producing A Perforated Thermoplastic Sheet which issued Sep. 18, 1962 to W. F. Zimmerli; and U.S. Pat. No. 2,567,275, Apparatus And Method Of Goffering Thermoplastic-tic Materials which issued Sep. 11, 1951 to R. Colombo. See also U.S. Pat. No. 3,674,221, Dynamic Stress-Strain Testing Of Ribbons Of Film which issued Jul. 4, 1972 to Coenraad E. Riemersma.

The prior art also discloses various methods of making perforated members: see for instance U.S. Pat. No. 3,453,712, Method Of Making A Porous Roll which issued Jul. 8, 1969 to R. G. MacKendrick; U.S. Pat. No. 3,613,208, Method Of Fabricating A Perforated Panel For A Vacuum Work-Holder Or Chuck which issued Oct. 19, 1971 to H. A. Seberg et al.; and U.S. Pat. No. 3,247,579, Circuit Fabrication Method which issued Apr. 26, 1966 to L. H. Cattermole et al.

Methods and apparatuses for imparting a three-dimensional polymeric web having improved tactile impression are disclosed in U.S. Pat. No. 4,151,240, Method for Debossing and Perforating a Running Ribbon of Thermoplastic Film, which issued Apr. 24, 1979 to Lucas et al.; and U.S. Pat. No. 4,601,868, Method of Imparting a Three-Dimensional Fibr-Like Appearance and Tactile Impression to a Running Ribbon of Thermoplastic Film, which issued Jul. 22, 1986 to Radel et al.

Other methods and apparatuses have been disclosed for making polymeric webs exhibiting a soft and silky tactile impression. For example, U.S. Pat. No. 4,609,518 and U.S. Pat. No. 4,629,643, each issued to Curro et al., and issued Sep. 2, 1986, and Dec. 16, 1986, respectively, disclose an apparatus for forming a polymeric web having large apertures and a plurality of fine-scale apertures.

The above-mentioned references are representative of various methods and apparatuses for embossing or debossing polymeric films on a supporting framework, often termed a forming structure or screen. In particular, many of these references disclose the use of cylindrical metal screens comprising an interconnecting network defining a plurality of apertures to which a polymeric film can conform when impinged upon by a fluid such as jets of water or heated air. The plurality of apertures provides for a relatively high open area through the screen through which water, for example, can pass through. One example of the use of such screens for the application of high pressure liquid jet or stream to a web of polymeric film is disclosed in U.S. Pat. No. 4,778,644, issued to Curro et al., and issued Oct. 18, 1988.

Metal forming structures, e.g., screens, of the type disclosed above suffer from a relatively short useful life. That is, because of the relatively thin interconnecting network (necessary to provide sufficient open area for film formation), prior art screens have a limited useful life when used in a commercial process involving subjecting the screen to high pressure water jets in a continuous cyclic process. Metal screens of the type disclosed in the above-mentioned Radel, for example, are very expensive to make, so that the cost of products made thereon is negatively impacted by a limited useful life. It is believed that the limited useful life is due to fatigue failure of present screens due to the cyclic stress/relaxation experienced when the screen is part of a cylindrical forming structure that rotates past high pressure liquid jets.

Accordingly, there is a need for a more durable forming screen useful for making three-dimensional formed film webs.

SUMMARY OF THE INVENTION

A forming structure for use in an apparatus for making formed polymeric film is disclosed, the forming structure comprising a first portion comprising a network of interconnecting members defining apertures, the apertures being spaced in a pattern defining a first percent open area, a second portion being solid and having no apertures and zero percent open area; and a third portion being a transition between and joining the first and second portions, the transition portion exhibiting a second percent open area, the second percent open area of the third portion being less than the first percent open area of first portion.

BRIEF DESCRIPTION OF THE DRAWING

While the specification concludes with claims particularly pointing out and distinctly claiming the subject matter of the present invention, it is believed that the invention will be better understood from the following description taken in conjunction with the accompanying Figures, in which:

DETAILED DESCRIPTION OF THE INVENTION

Figure 1:
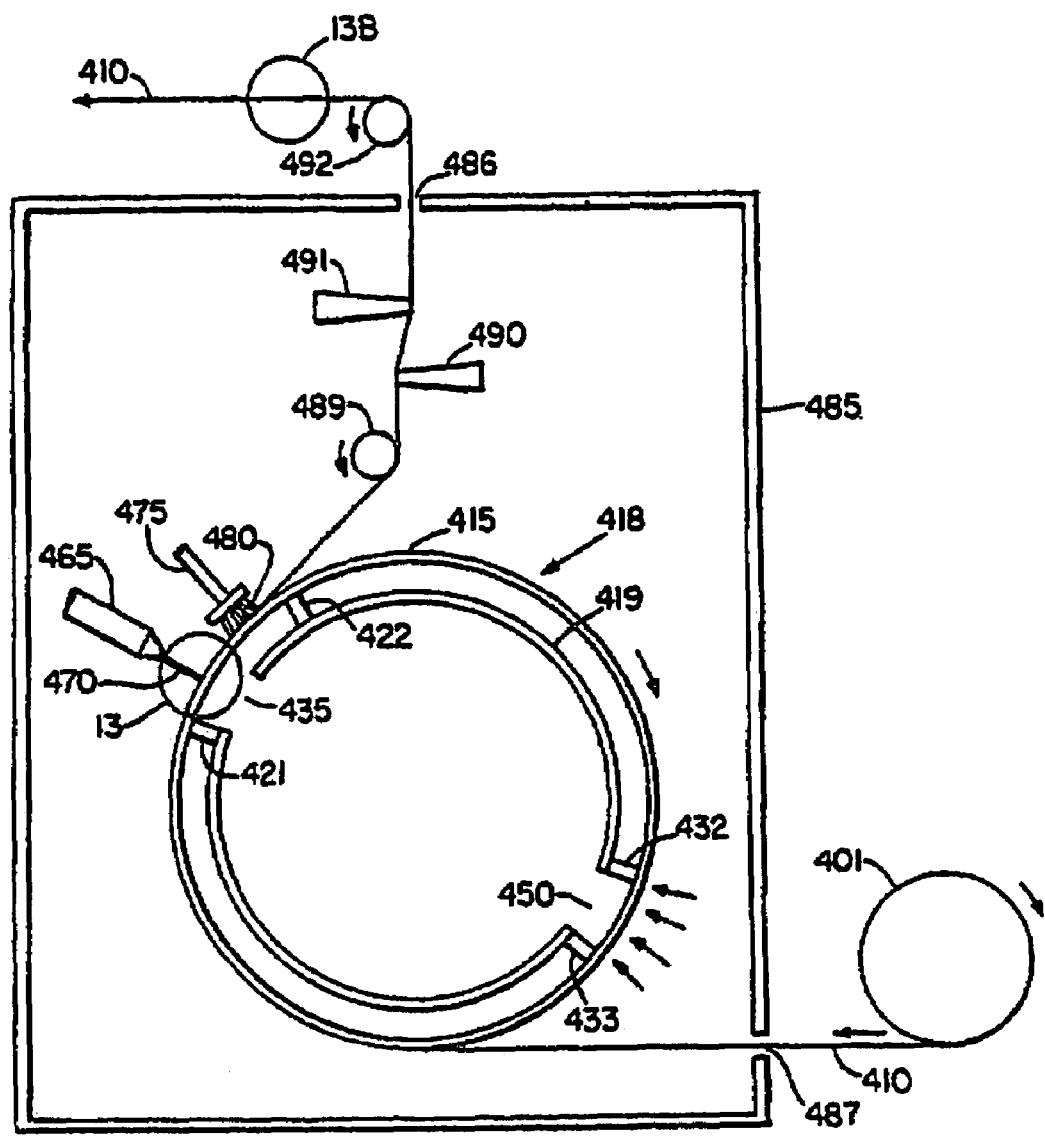
FIG. 1 is an apparatus of the type generally disclosed in U.S. Pat. No. 4,778,644.

FIG. 1 is a simplified cross-sectional schematic illustration depicting the method taught in U.S. Pat. No. 4,778,644 for producing formed, three-dimensional, polymeric webs using high pressure water jets. This apparatus is representative of the type in which the improved forming structure of the present invention can be utilized. Briefly, in the apparatus shown in FIG. 1, a web of substantially planar film 410 comprised of a polymeric material such as polyethylene is fed from a supply roll 401 onto the surface of a forming drum 418 about which a forming structure 415 continuously rotates at substantially the same speed as the incoming web. It is the forming structure 415 that is the subject matter of the present invention.

The forming drum 418 preferably includes an internally located vacuum chamber 419 which is preferably stationary relative to the moving forming structure 415. A pair of stationary vacuum seals 421, 422 approximately coinciding with the beginning and end, respectively, of the vacuum chamber's first inlet 435 are used to establish a seal between the innermost surface of the rotating forming structure 415 and the first vacuum chamber inlet 435. An additional pair of seals 432, 433 establish a similar seal between the innermost surface of the rotating forming structure 415 and a second vacuum chamber inlet 450. The second vacuum chamber inlet 450 is positioned in an area of the forming drum 418 where it will not be blocked by the web of film 410.

Opposite the first vacuum chamber inlet 435 there is preferably provided means for applying a fluid pressure differential to the substantially planar web of polymeric film 410 as it traverses the area of the forming drum intermediate vacuum seals 421, 422. In the illustrated embodiment, the fluid pressure differential applicator means comprises a high pressure liquid nozzle 465 which discharges a jet of high pressure liquid 470, such as water, substantially uniformly across the entire width of the moving polymeric web 410. The water is preferably applied at a pressure of at least about 350 N/cm2 (500 psig), most preferably at least about 700 N/cm2 (1,000 psig). The water is also preferably applied at an elevated temperature which is below the transformation temperature range of the incoming polymeric web so that the web remains in a substantially solid state throughout the entire process. This preserves the physical properties and thermo-mechanical history of the incoming web.

Other details are disclosed in U.S. Pat. No. 4,778,644 with respect to the apparatus shown in FIG. 1, including applying a continuous film of cooling water 480 to the exposed surface of the web 410 via a low pressure liquid nozzle 475, as generally shown in FIG. 1. The water is preferably flooded onto the film prior to its removal from the forming structure 415, but subsequent to its formation by the high pressure liquid jet 470. An additional vacuum chamber inlet 450 is provided in the centrally located vacuum manifold 419. This second vacuum chamber inlet 450 is provided in an area of the forming drum 418 where the forming structure 415 is unobstructed by the web of film 410. The second vacuum inlet 450 reestablishes vacuum induced airflow through the rotating forming structure 415 to cool the forming structure and to provide internal venting/cooling of the cabinet 485 enclosing the forming drum 418 and the high pressure liquid nozzle 465. Finally, the web path is redirected inside the cabinet 485, as generally shown in FIG. 1, to provide the shortest possible traverse through the cabinet. In particular, the unprocessed flat polymeric web 410 enters the cabinet through inlet slot 487, is carried by the rotating forming structure 415 about approximately half the periphery of the stationary forming drum 418 and is thereafter removed via idler rolls 489 and 492 for final drying and either rewinding or end use applications. A pair of op-posed rubber blades 490, 491 provide bulk dewatering of the web by producing a squeegee-like action on the web 410 as the web passes between idler rolls 489 and 492. Routing the web in the manner shown in FIG. 1 minimizes any reheating of the web after it has been cooled by the film of cooling water 480 applied by low pressure liquid nozzle 475.

Other details as to the effects of varying the water temperature and the preferred construction and positioning for high pressure liquid nozzle 465 are set forth in U.S. Pat. No. 4,695,422, and also in U.S. Pat. No. 4,609,518 issued to Curro et al. on Sep. 2, 1986 being hereby incorporated herein by reference.

Figure 2:
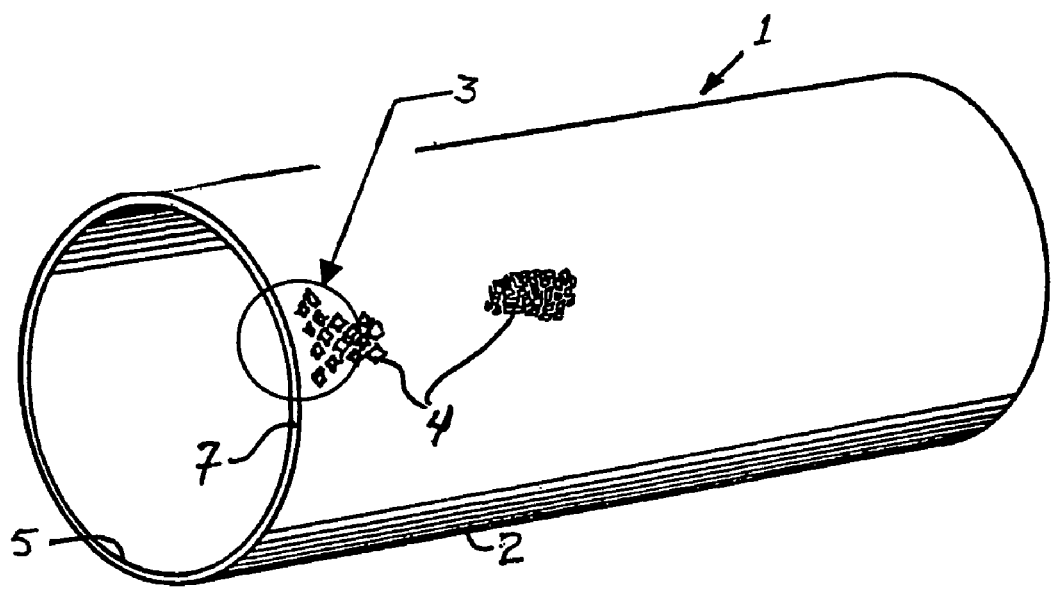
FIG. 2 is an enlarged, partially segmented, perspective illustration of a prior art polymeric web of the type generally disclosed in commonly assigned U.S. Pat. No. 4,629,643.

FIG. 2 shows a cylindrical forming structure 1 of the present invention that can be utilized in place of the forming structure 415 of the apparatus of FIG. 1. Forming structure 1 has an outer surface 2 that is the forming surface, i.e., it is utilized to form the polymeric web brought in contact therewith, and an inner surface 5 that generally does not contact the polymeric web during the forming operation. Forming structure 1 comprises a continuous network of metal interconnecting members 6 (not shown in FIG. 2) defining a discontinuous plurality of discrete apertures, e.g., apertures 4.

Figure 3:
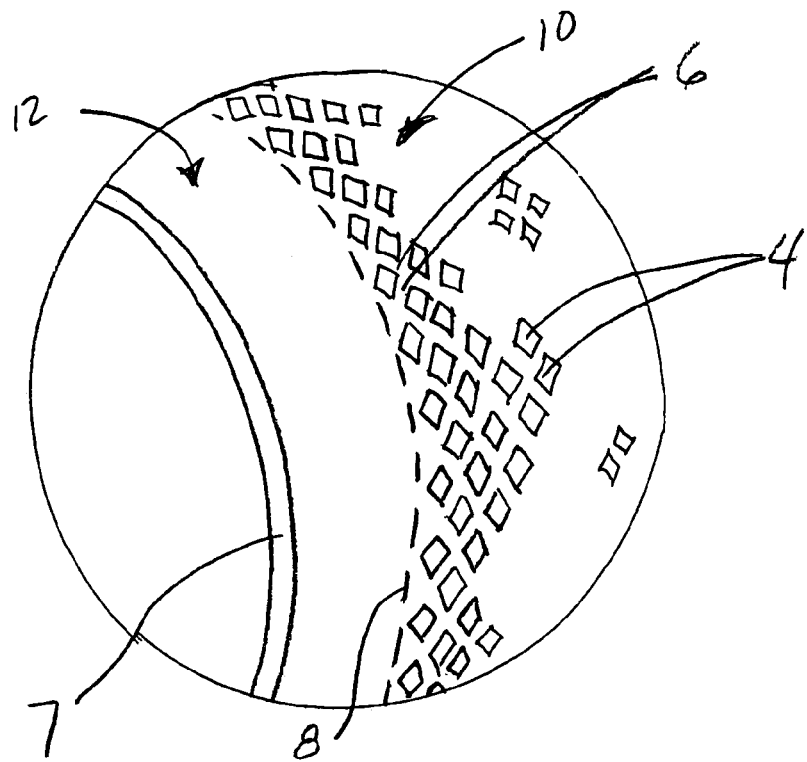
FIG. 3 is an enlarged, partially perspective illustration of a portion of a prior art forming structure.
Figure 4:
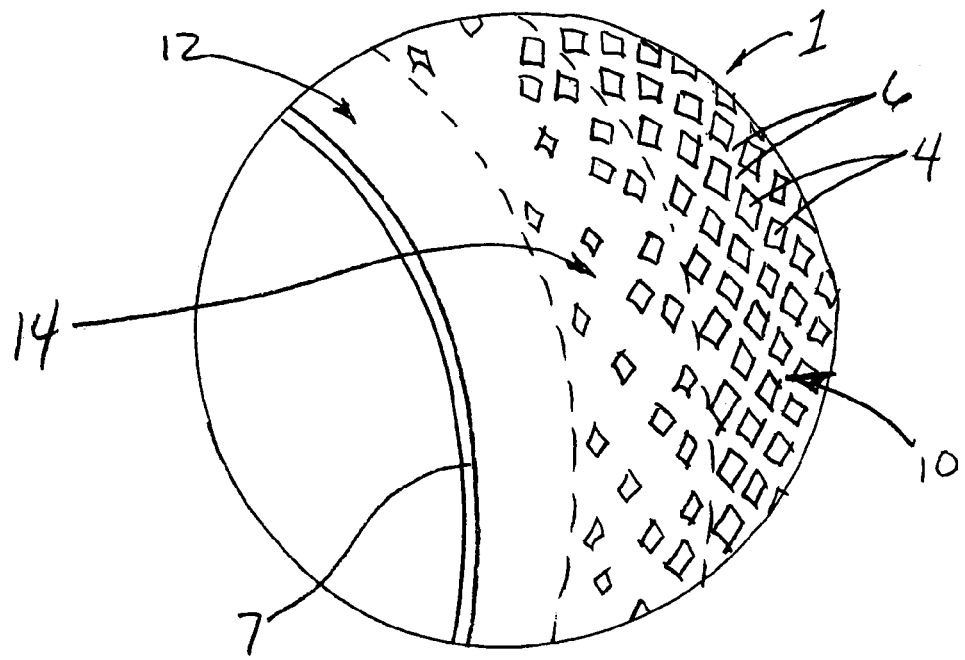
FIG. 4 is an enlarged, partially perspective illustration of a portion of a forming structure of the present invention.

FIGS. 3 and 4 show an enlarged portion of a prior art forming structure and a forming structure of the present invention, respectively, to more clearly show aspects of the present invention. In both, a circular cylindrical forming structure is considered, since this shape is useful in a rotating drum process.

As shown in FIG. 3, the pattern of interconnecting members 6 that define apertures 4, stops abruptly along an imaginary line indicated as line 8 from a first patterned region 10 to a second non-patterned, i.e., solid region 12. On a circular cylindrical forming structure patterned region 10 and solid region 12 can each be considered to be cylindrical, and joined at relatively narrow, abrupt line 8 that is itself circular. In use, failure of the forming structure is found to occur at the portion of forming structure corresponding to the generally linear, abrupt transition line 8 between the first patterned region 10 and the second non-patterned region 12. It is believed that failure along this portion, designated generally as the portion corresponding to line 8, is due to the stress concentrations developed by the relatively abrupt transition from patterned region 10 to non-patterned region 12. The cyclic nature of forming three-dimensional polymeric webs, particularly when forming is by high pressure liquid jets, results in cyclic metal fatigue and the corresponding failure.

In contrast, as can be seen in FIG. 4, forming structure 1 of the present invention solves the problem of fatigue failure in metal forming screens by eliminating the generally linear, abrupt transition between the first patterned region 10 and the second non-patterned region 12. As shown, in addition to patterned region 10 and the non-patterned region 12, the forming structure 1 has a third portion being a transition portion 14 comprising a gradual phasing in, so to speak, of apertures 4. Rather than a circular line, e.g., line 8, the transition region 14 of the present invention is more accurately described as a band, or as an additional cylindrical portion joined to both the first patterned region 10 and the second non-patterned region 12.

Therefore, in one embodiment, forming structure 1 can be described as a forming structure for use in an apparatus for making formed polymeric film, the forming structure being cylindrically tubular and comprising a first cylindrical portion 10 comprising a network of interconnecting members 6 defining apertures 4, a second cylindrical portion 12 being solid and having no apertures; and a third cylindrical portion 14 being a transition between and joining the first and second portions, the transition portion exhibiting an increasing number of interconnecting members defining an increasing number of apertures when viewed from the second portion to the first portion.

The term "continuous" when used herein to describe the interconnecting members 6, refers to the uninterrupted character of the interconnecting members 6. Thus, any point on the first surface 2 can be reached from any other point on the first surface 2 without leaving the first surface 2 by simply following a path of interconnecting members 6. Conversely, as utilized herein, the term "discontinuous" when used to describe the discrete apertures 4 refers to the interrupted character of the plurality of apertures 4.

Figure 5:
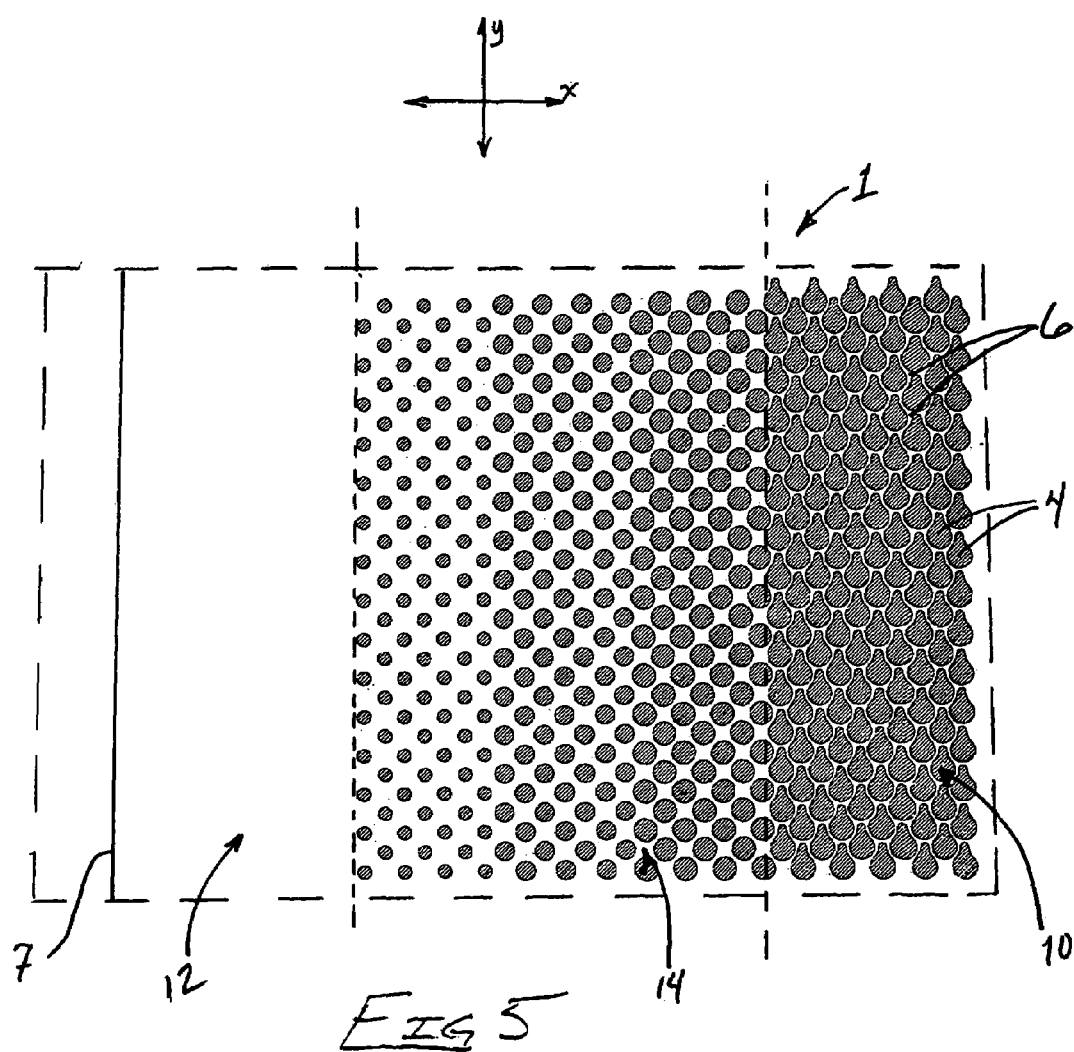
FIG. 5 is a schematic representation of a portion of one embodiment of a forming structure of the present invention.
Figure 6:
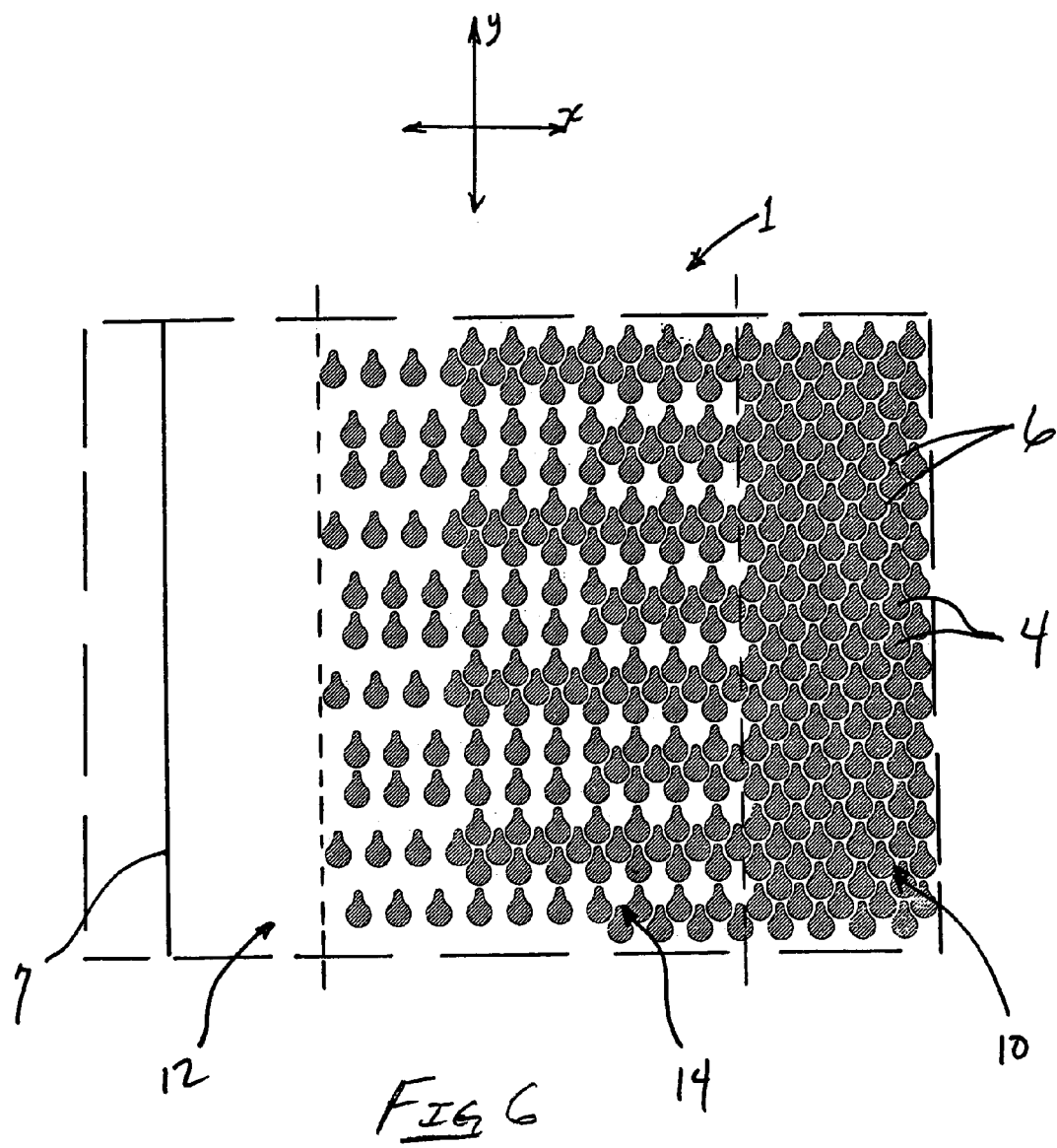
FIG. 6 is a schematic representation of a portion of another embodiment of a forming structure of the present invention.
Figure 7:
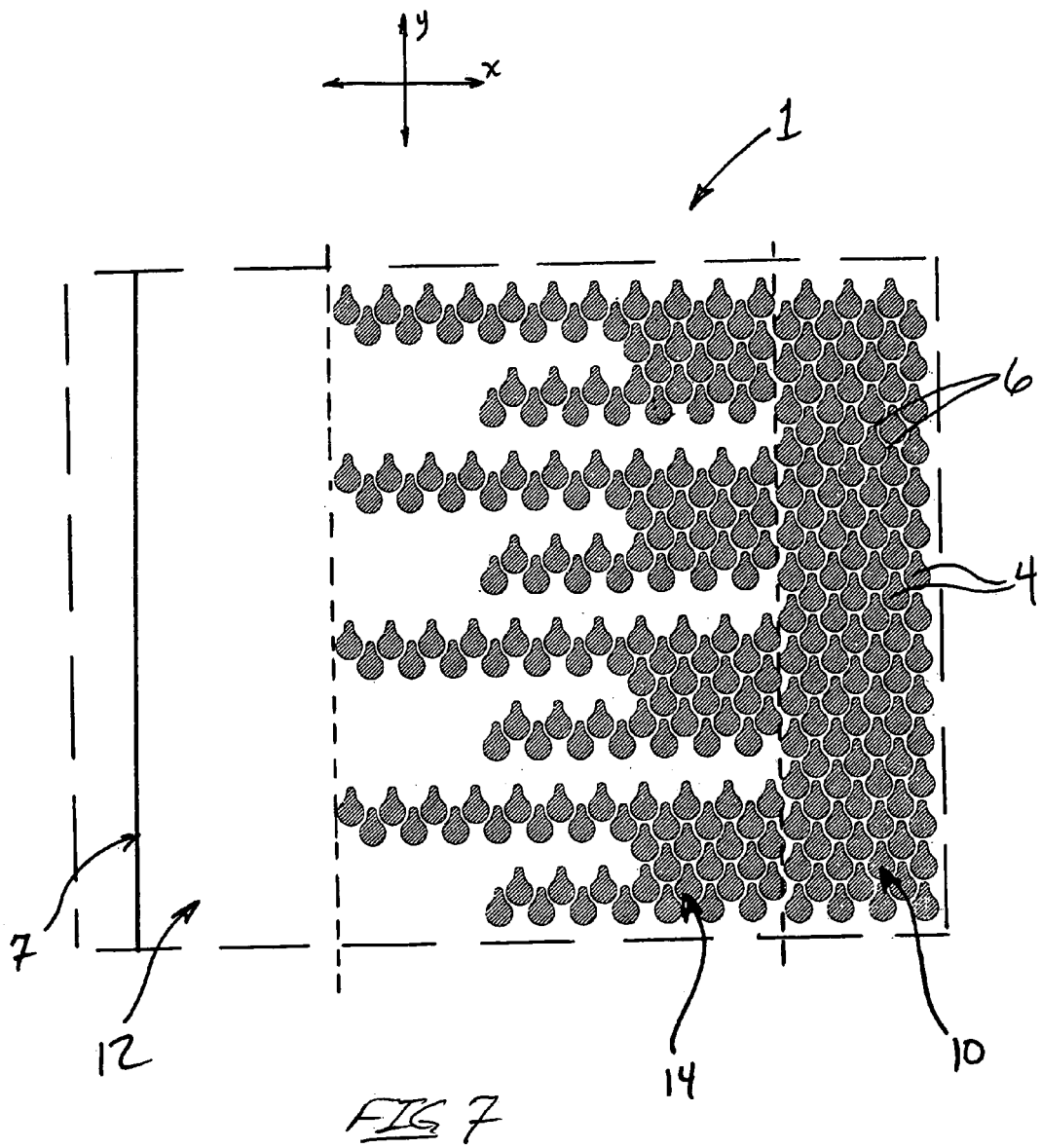
FIG. 7 is a schematic representation of a portion of another embodiment of a forming structure of the present invention.

FIGS. 5–7 show further variations on patterns of the first, second and third portions described above for forming structure 1 of the present invention. In each of FIGS. 5–7, the portion within the long dashed line is meant to be a representative pattern of a portion of the forming structure at the transition region, e.g., the region denoted within circle 3 in FIG. 2.

As shown in FIG. 5, the pattern on interconnecting members 6 defines apertures 4 having the general shape of a teardrop in the first portion 10 (which can be a cylindrical portion when on a cylindrical forming structure 1). Likewise, in second region 12 there are no apertures 4. In the embodiment shown in FIG. 5 the transition portion 14 comprises a plurality of circular-shaped apertures, the number and spacing of the circular-shaped apertures varying to gradually phasing in to an increasing number of apertures when viewed from the second portion 12 to the first portion 10.

In an actual embodiment, the pattern shown in FIG. 5 is characterized by transition portion 14 being about 25 mm (about 1 inch) in the dimension measured along the x-axis as shown. (The y-axis corresponds to the circumferential direction of a tubular forming structure as shown in FIG. 2.) This design comprises teardrop-shaped apertures in the first portion 10, each aperture having an area of about 2 mm$^2$. In the embodiment shown the third, transition portion 14 exhibits three distinct changes in open area, each being a 25% reduction in open area reduction when compared to the original teardrop design in first portion 10. The pattern shown allows for a full 360 degree repeat which is important for tubular forming structures, such as the type shown in FIG. 2.

The pattern of apertures shown in FIG. 6 is similar to that of FIG. 5, except that the teardrop-shaped apertures are maintained in third, transition portion 14. The percent open area is reduced in three distinct regions of transition portion 14, the reduction being 25%, 38%, and 63% when considered right to left along the x-axis as shown in FIG. 6. The pattern shown allows for a full 360 degree repeat which is important for tubular forming structures, such as the type shown in FIG. 2.

The pattern of apertures shown in FIG. 7 is similar to that of FIG. 6, except that the reduction in the three distinct regions of transition portion 14 is 25%, 50%, and 75% when considered right to left along the x-axis as shown in FIG. 7. The pattern shown allows for a full 360 degree repeat which is important for tubular forming structures, such as the type shown in FIG. 2.

In another embodiment, therefore, forming structure 1 can be described as a forming structure for use in an apparatus for making formed polymeric film, the forming structure comprising a first portion 10 comprising a network of interconnecting members 6 defining apertures 4, the apertures being spaced in a pattern defining a first percent open area, a second portion 12 being solid and having no apertures and zero percent open area; and a third portion 14 being a transition between and joining the first and second portions, the transition portion exhibiting an second percent open area, the second percent open area of the third portion 14 being less than the first percent open area of first portion 10.

All documents cited in the Detailed Description of the Invention are, are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A forming structure for use in an apparatus for making formed polymeric film, the forming structure being cylindrically tubular and comprising:
   a. a first cylindrical portion comprising a network of interconnecting members defining apertures;
   b. a second cylindrical portion being solid and having no apertures; and
   c. a third cylindrical portion being a transition between and joining said first and second portions, the transition portion exhibiting an increasing number of interconnecting members defining an increasing number of apertures when viewed from said second portion to said first portion.

* * * * *